United States Patent
Howard et al.

(10) Patent No.: US 6,631,326 B1
(45) Date of Patent: Oct. 7, 2003

(54) SYSTEM AND METHOD FOR PERFORMING FLOOD ZONE CERTIFICATIONS

(75) Inventors: John Willard Howard, North Richland Hills, TX (US); Dan Martin Scott, Irving, TX (US); Darin Wayne Higgins, Fort Worth, TX (US)

(73) Assignee: SourceProse Corporation, Watauga, TX (US)

( * ) Notice: Subject to any disclaimer, the term of this patent is extended or adjusted under 35 U.S.C. 154(b) by 0 days.

(21) Appl. No.: 09/537,161

(22) Filed: Mar. 29, 2000

(51) Int. Cl.$^7$ ................................................. G01L 1/26
(52) U.S. Cl. ............................................ 702/5; 702/34
(58) Field of Search ........................... 702/5, 3, 14, 34; 701/209; 364/420; 395/207; 348/135; 703/10, 5

(56) References Cited

U.S. PATENT DOCUMENTS

| | | | |
|---|---|---|---|
| 4,737,916 A | | 4/1988 | Ogawa et al. ............... 364/443 |
| 4,885,706 A | * | 12/1989 | Pate et al. ..................... 703/10 |
| 5,247,356 A | | 9/1993 | Ciampa ....................... 358/109 |
| 5,414,462 A | * | 5/1995 | Veatch ........................ 348/136 |
| 5,422,989 A | | 6/1995 | Bell et al. .................... 395/133 |
| 5,467,271 A | * | 11/1995 | Abel et al. ................... 364/420 |
| 5,487,139 A | | 1/1996 | Saylor et al. ................ 395/135 |
| 5,592,375 A | * | 1/1997 | Salmon et al. .............. 395/207 |
| 5,596,494 A | | 1/1997 | Kuo ............................. 364/420 |
| 5,699,244 A | | 12/1997 | Clark, Jr. et al. ........... 364/420 |
| 5,842,148 A | | 11/1998 | Prendergast et al. .......... 702/34 |
| 5,848,373 A | | 12/1998 | DeLorme et al. ........... 701/200 |
| 5,884,216 A | | 3/1999 | Shah et al. .................. 701/207 |
| 5,902,347 A | | 5/1999 | Backman et al. ........... 701/200 |
| 5,904,727 A | | 5/1999 | Prabhakaran ............... 701/208 |
| 6,032,157 A | | 2/2000 | Tamano et al. ............. 707/104 |
| 6,084,989 A | | 7/2000 | Eppler ......................... 382/293 |
| 6,321,158 B1 | | 11/2001 | DeLorme et al. ........... 701/201 |
| 6,377,278 B1 | | 4/2002 | Curtright et al. ............ 345/634 |
| 6,504,571 B1 | | 1/2003 | Narayanaswami et al. ..................... 348/231.99 |

FOREIGN PATENT DOCUMENTS

| | | |
|---|---|---|
| EP | 0 454 129 A2 | 10/1991 |
| EP | 0 619 554 A2 | 10/1994 |
| WO | WO 90/14627 | 11/1990 |
| WO | WO 97/49027 | 12/1997 |

OTHER PUBLICATIONS

Li et al., "Accuracy Assessment of Mapping Products Produced from the Star–3$i$ Airborne IFSAR System".

Fukunaga et al., "Image Registration Using an Image Graph and its Application to Map Matching," IEE Proceedings–E, vol. 138, No. 2, Mar. 1991.

Wang, "Integrating GIS's and Remote Sensing Image Analysis Systems by Unifying Knowledge Representation Schemes," IEEE Transactions on Geoscience and Remote Sensing, vol. 29, No. 4, pp. 656–664, Jul. 1991.

Roux, "Automatic Registration of Spot Images and Digitized Maps," IEEE, pp. 625–628, 1996.

* cited by examiner

Primary Examiner—John Barlow
Assistant Examiner—Victor J. Taylor
(74) Attorney, Agent, or Firm—Finnegan, Henderson, Farabow, Garrett & Dunner, L.L.P.

(57) ABSTRACT

A system and method for performing flood zone determinations using scanned, georeferenced, digital raster map images. The user, to determine the flood zone classification of a particular property, first enters the street address, or full legal address, into a data processing system. The system determines, from the address, which raster map includes that particular property. The system retrieves that map, and utilizes georeferencing information to locate the property on the raster map. The user can visually verify the location of the property as marked on the displayed raster map, and can at that point examine the flood zone indications on the raster map. Further, the system can compare the geographic coordinates of the property against a database of flood zone boundaries for an automated flood zone determination. The system can also generate, store, and produce flood zone certificates according to the flood zone determination.

27 Claims, 4 Drawing Sheets

SYSTEM AND METHOD FOR PERFORMING FLOOD ZONE CERTIFICATIONS

CROSS REFERENCE TO RELATED APPLICATIONS

This application contains some specification and figures in common with concurrently filed, commonly assigned, copending application "System and Method for Georeferencing Digital Raster Maps" Ser. No. 09/537,849 filed Mar. 29, 2000, under and "System and Method for Synchronizing Raster And Vector Map Images" Ser. No. 09/537,162 filed Mar. 29, 2000, which are hereby incorporated by reference.

BACKGROUND OF THE INVENTION

1. Technical Field

The present invention generally relates to analysis of geographic features and characteristics, and in particular to a system and method for performing flood zone determinations.

2. Description of the Related Art

Today, before a real property is bought, sold, or insured, it is common practice to examine the property for the risk of flooding. This is commonly done by examining the flood zone the property falls into based on its location and elevation. The Federal Emergency management Agency (FEMA) publishes a library of tens of thousands of paper maps showing various types of flood zones and their location in the United States. A flood zone determination on a property is frequently done in the following way.

1. The address of the property is examined, and the location of the property is determined (perhaps through the use of a geocoding system, or by examining an available street map).

2. A map analyst attempts to determine which of the many thousands of FEMA flood maps will contain this property.

3. The map analyst goes to a map storage area and retrieves the desired map, often examining several maps before making a final decision.

4. Having retrieved the paper map, the map analyst next determines where, precisely, the property is located on the map.

5. Finally, the map analyst examines flood zone notations on the map at the property's location in order to determine its flood zone status.

This process can be somewhat improved by scanning the paper FEMA maps into a computer to produce a digital raster map, which can be retrieved and viewed as necessary. A digital raster map is a computerized map image that resembles a conventional paper map in that it presents an image of the mapped area, but has no additional underlying data associated with the features of the map. A raster map is typically created by scanning a conventional paper map, and is a grid-based map composed of pixels (or dots) of color or black & white. Each pixel in the grid can be referenced by the pixel coordinates, and has only one associated value, indicating the color of that pixel. Raster images are commonly referred to as "bit mapped" images.

A vector map uses lines and polygons, rather than pixels, to describe an image. Unlike a raster map, in which the map image is simply stored as a grid of pixels, when a vector map is displayed, it is drawn from a set of underlying data. The vector map is created through the placements of nodes on a plane and connecting those nodes with lines. Vector lines can be attributed with tables of data such as elevations, values, names or other information relative to the line. Vector data can be displayed in three dimensions if the lines are attributed with z values, modified or changed relative to user need, or layered to allow for turning off and on the viewing of different information.

Because of their feature attribution properties, vector maps are particularly useful for displaying geographic data. Vector maps are used to display boundaries or lines that denote the position and extent of features, such as county boundaries or lines denoting stream and river systems. It is also very easy to view or manipulate the data underlying a vector map, for example to view or change the elevation of a feature.

Also, because vector maps are drawn from a data set which describes the locations of features shown, they are often inherently georeferenced. Georeferencing is the process of relating source coordinates to referenced geographic coordinates, which are typically in standard latitude/longitude. An image or a vector file is georeferenced to be used within a mapping/geographic environment. In a vector map, the data from which the map is drawn will typically already include a geographic coordinate set.

Modern GIS systems normally make use of digital vector-based map information. However, a vast legacy of paper-based map information exists. It is very expensive and time consuming to convert all of the information on these paper maps over to a digital vector format. In many cases the scope and expense of such conversions render them completely impractical. However, even when a complete conversion to digital vector-based format is not possible, it is still possible to obtain some of the benefits of computerized map systems, first by converting the paper maps to digital raster maps (by scanning them), and then by georeferencing the raster image. After georeferencing, there should be a clear relationship between the pixel coordinates in the raster map, and the geographic coordinates of the feature represented by that pixel.

Since floodzone determinations are typically performed using paper FEMA maps, it would be desirable to provide a system and method for performing flood zone certifications that is faster and can be performed less expensively than the process described above.

SUMMARY OF THE INVENTION

It is therefore one object of the present invention to provide an improved method for analysis of geographic features and characteristics.

It is another object of the present invention to provide an improved system and method for performing flood zone determinations.

The foregoing objects are achieved as is now described. The preferred embodiment provides a system and method for performing flood zone determinations using scanned, georeferenced, digital raster map images. The user, to determine the flood zone classification of a particular property, first enters the street address, or full legal address, into a data processing system. The system determines, from the address, which raster map includes that particular property. The system retrieves that map, and utilizes georeferencing information to locate the property on the raster map. The user can visually verify the location of the property as marked on the displayed raster map, and can at that point examine the flood zone indications on the raster map. Further, the system can compare the geographic coordinates of the property against a database of flood zone boundaries for an automated flood zone determination. The system can also generate, store, and produce flood zone certificates according to the flood zone determination.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
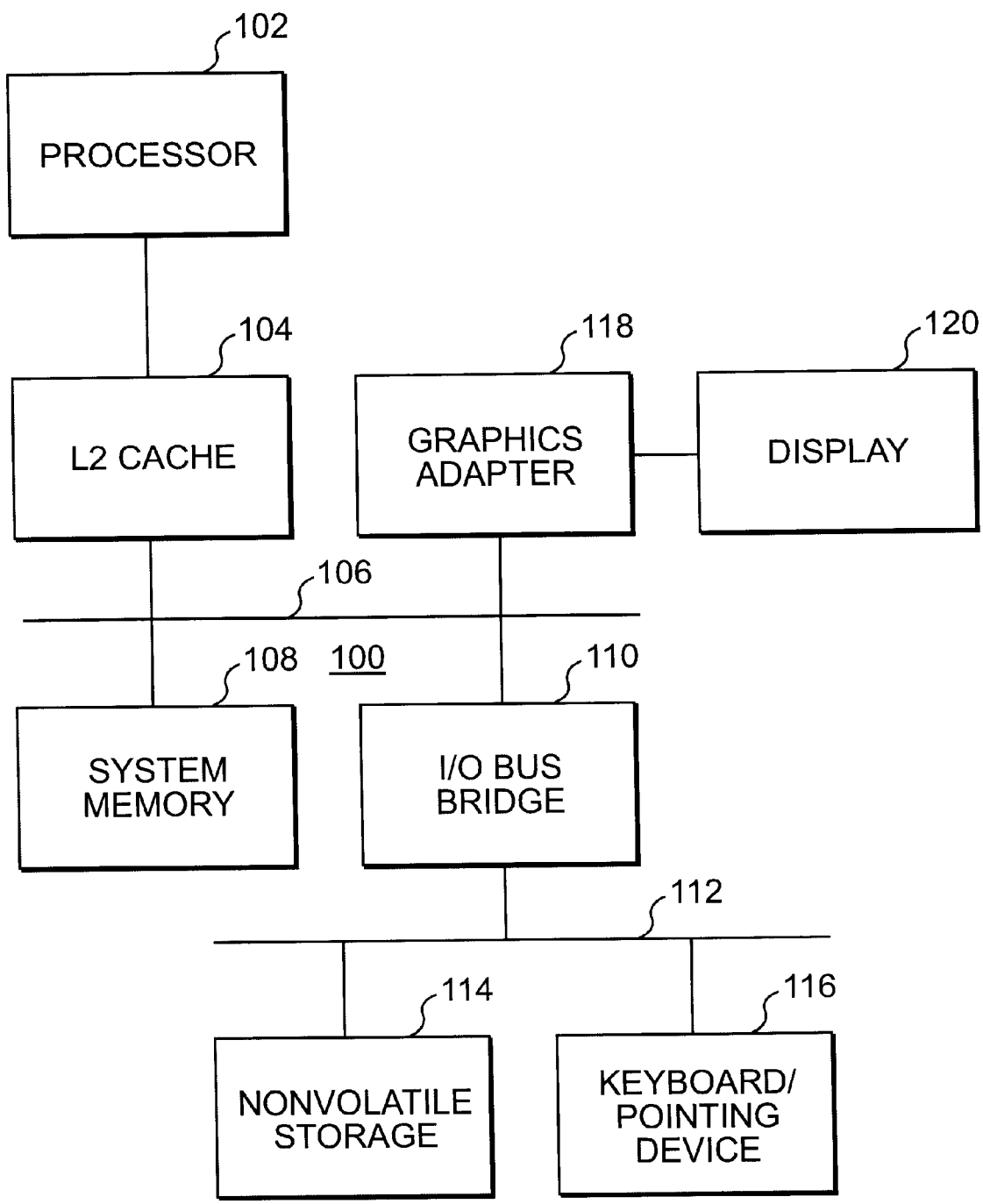
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 includes processor 102 and associated L2 Cache 104, which in the exemplary embodiment is connected in turn to a system bus 106. System memory 108 is connected to system bus 106, and may be read from and written to by processor 102.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. Data processing system 100 is provided solely as an example for the purposes of explanation and is not intended to imply architectural limitations.

The data processing system described above can also include one or more image scanners, to convert a map from paper format to a digital raster map.

The preferred embodiment provides a system and method for performing flood zone determinations using scanned, georeferenced, digital raster map images. The user, to determine the flood zone classification of a particular property, first enters the street address, or full legal address, into a data processing system. The system determines, from the address, which raster map includes that particular property. The system retrieves that map, and utilizes georeferencing information to locate the property on the raster map. The user can visually verify the location of the property as marked on the displayed raster map, and can at that point examine the flood zone indications on the raster map. Further, the system can compare the geographic coordinates of the property against a database of flood zone boundaries for an automated flood zone determination. The system can also generate, store, and produce flood zone certificates according to the flood zone determination.

Figure 2:
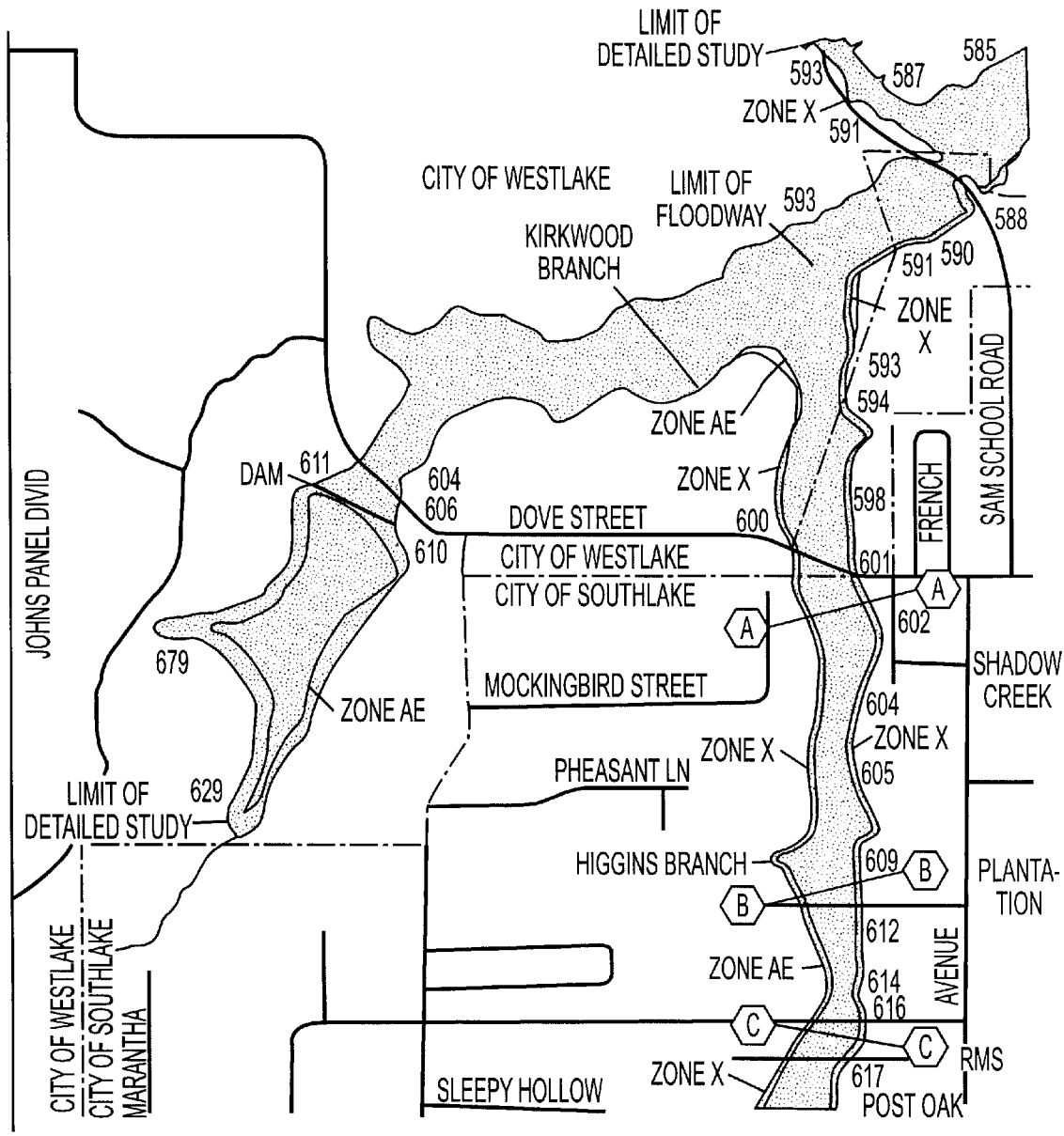
FIG. 2 is an exemplary raster map, in accordance with the preferred embodiment.

FIG. 2 is an exemplary raster map, in accordance with the preferred embodiment. This exemplary map shows a scanned image from a Federal Emergency Management Agency (FEMA) paper map. This raster image shows a land area with flood zone indications, but would, in a computer system, contain no underlying data regarding the area shown.

As is well known, FEMA panel maps depict an outer border, called "neatlines" which contain the flood-zone-indicated land area. The border of this land area may or may not coincide with the neatlines and may be viewed as comprising a polygon. This land area or polygon is referred to as an "inset" of the panel map. A panel map may include more than one inset.

Figure 3:
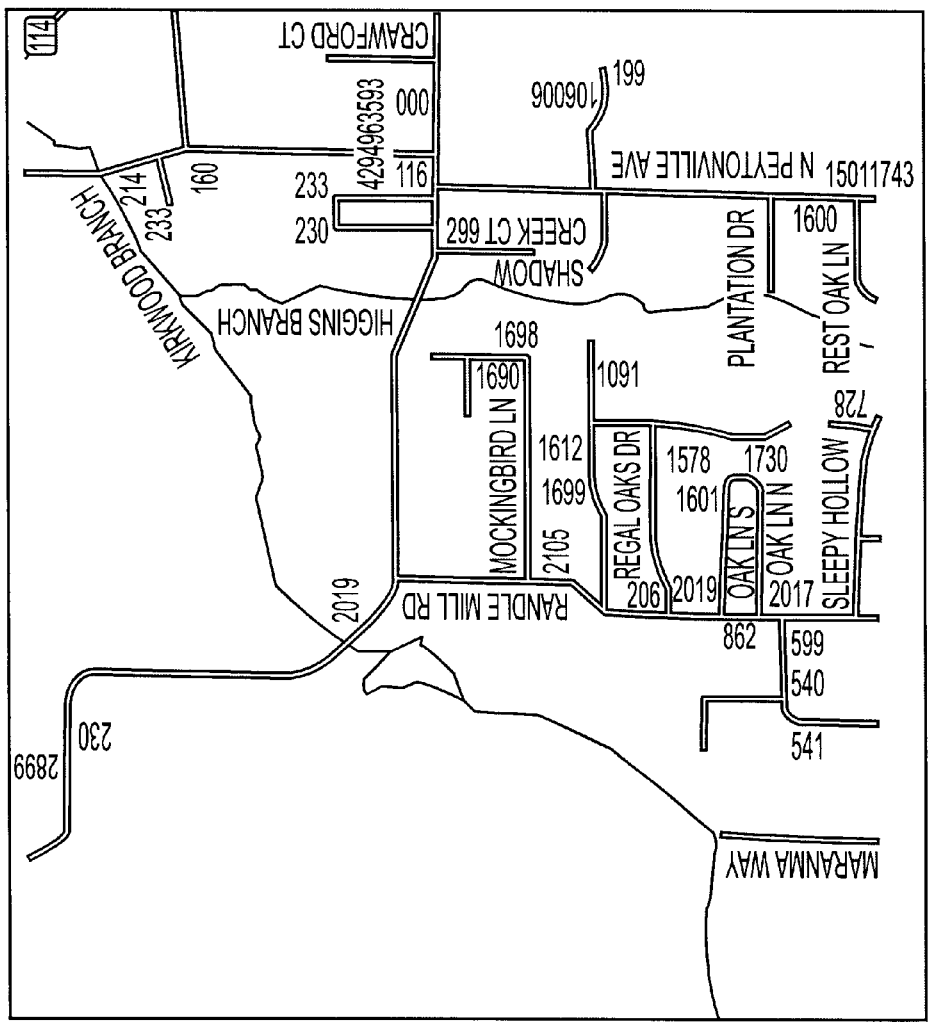
FIG. 3 is an exemplary vector map, corresponding to the raster map of FIG. 2, in accordance with a preferred embodiment of the present invention.
Figure 4:
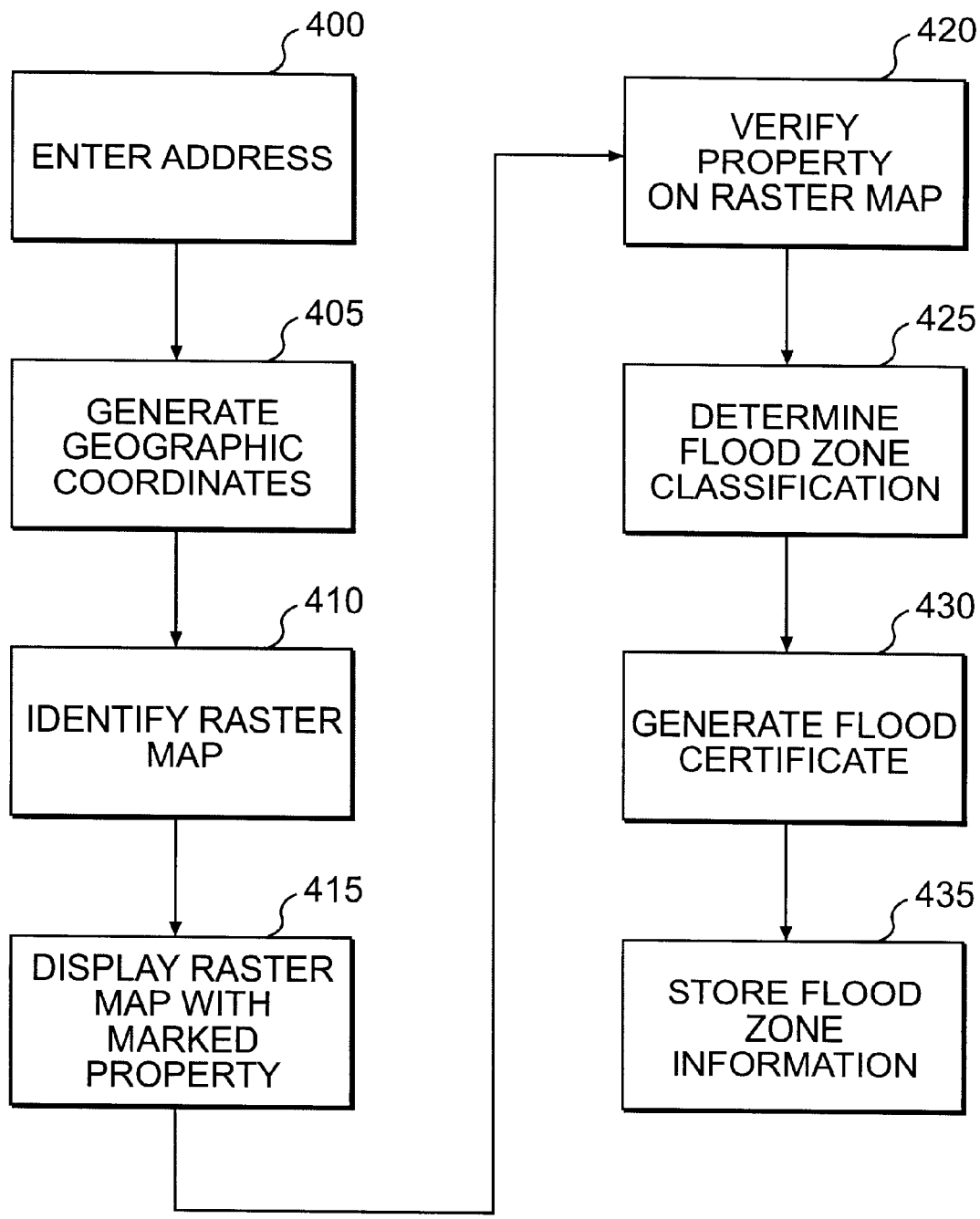
FIG. 4 is a flowchart of a process in accordance with a preferred embodiment of the present invention.

FIG. 3 is an exemplary vector map, corresponding to the raster map of FIG. 2, in accordance with a preferred embodiment of the present invention. This map shows the same area as the map in FIG. 2, but is created by a computer system from a database describing the locations of features such as the streets shown. Typically, each feature shown on a vector map such as this will already be georeferenced, in that the geographic coordinates of each feature will also be recorded in the underlying data.

A process for determining the flood zone classification of a property, in accordance with the preferred embodiment, is described below:

First, the address of the property is entered into the system (step 400), and its location, in longitude and latitude, is determined by the data processing system, using a conventional geocoding application (step 405).

Next, the data processing system determines the raster map image or images that contain the location of the property as determined above (step 410). This is done, in the preferred embodiment, by performing point in polygon tests of the location of the property against the polygons defining the map boundaries.

The system then displays the selected raster map image or images on the system display, and marks on each map the location of the property (step 415). If multiple maps are selected, each map image appears, allowing the user to display each image as desired.

The user determines which of the maps is, in fact, the correct one that provides a flood zone classification for the property (step 420). If only one map image was selected, the user verifies that it is the correct image.

The user then examines flood zone notations on the map at the property's location and visually determines its flood zone status (step 425).

After the user has verified the flood zone status, the system will generate a flood certificate which includes the property description or address, the flood zone designation, and any other information entered by the user (step 430). The flood certificate is stored on the computer from which location it can be delivered elsewhere by letter, fax, email, or other alternate methods (step 435).

The software component of the data processing system stored in the non-volatile storage of the data processing system, includes several components:

A georeferencing component, which allows longitudes and latitudes to be associated with points on the raster map images, as described more fully below.

A geocoding component, which is used to convert addresses into corresponding longitude and latitude values.

A database component, which stores and retrieves information about the maps, including georeferencing parameters, map boundary polygons (i.e., the boundaries of insets contained on a map panel), federally provided map panel data (e.g., that contained in the Flood Map Status Information System (FMSIS) database) and any other map specific information. The database is also used to store and retrieve historical information about previously complete flood zone certifications.

A map lookup component, which utilizes the georeferencing information, the map boundary polygons, and the location of the property to determine which maps contain the property. This can be done, since the georeferencing allows the border of the map panel to be described in terms of longitude and latitude. A "point in polygon" algorithm is applied to see which map panels contain the address location within their borders.

A map viewer/flood certificate generator, which:
a. Displays the candidate maps returned by the map lookup component
b. Places a marker at the estimated location of the property on each of the candidate maps.
c. Can display digital vector-based map(s) whose image is synchronized with the raster map. This means that the raster map and the vector map(s) always display the same geographic region. As the region selected in one map changes (by zooming, panning, scrolling, or other operation) so does the region displayed by the other map(s) change similarly. The georeferencing of the digital raster map provides the means by which the raster map and the vector-based map(s) may be synchronized.
d. Provides a location for the map analyst to record the flood zone status of the property.
e. Other information relevant to a flood zone certification is either entered by the map analyst, or is automatically entered from information stored in the database.

The georeferencing preocess is described below. A digital map image is considered georeferenced if a pair of mathematical functions, f, and g, have been defined that can be used to convert back and forth between the coordinates of the map image (as defined by the pixels of the image) and the corresponding longitude and latitude of the location of that point. That is, f and g do the following:

1. If (x,y) represents a location on the digital map image, then f(x,y)=(Lon, Lat) represents the longitude and latitude of the corresponding physical location.

2. If (Lon,Lat) represents a physical location that lies within the region covered by the map, then g(Lon, Lat)=(x, y) represents the point on the digital map image that corresponds to that longitude and latitude.

Here, x and y represent the natural internal coordinate system of the map image. Typically, as described above, a digital raster map image uses the pixels of its image as a natural coordinate matrix. However, in most cases, a vector-based map image uses longitude and latitude as its internal coordinate system; if so, it can be considered to be trivially georeferenced already. Therefore, the functions f( ) and g( ) above are non-trivial georeferencing functions required to convert back and forth between coordinate systems.

Once the raster map images of the preferred embodiment are georeferenced, the system can easily locate specific geographic locations on the raster map. While the process of the preferred embodiment has assumed that the required paper map has been previously georeferenced, it is also possible that the property in question is only found on a traditional paper map. If this is the case, the user may scan the paper map into the data processing system to create a raster map image. The image may then be georeferenced to provide georeferencing functions for converting between the raster map image coordinates and the geographic coordinates. Once this has been done, the process of the preferred embodiment can be performed as described above.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for determining flood zone classification for real property, comprising the steps of:
receiving property identification data in a data processing system;
determining geographic coordinates corresponding to the property identification data;
displaying a map image with image coordinates corresponding to the geographic coordinates; and
storing a flood zone classification corresponding to the geographic coordinates.

2. The method of claim 1, further comprising the step of receiving, in the data processing system, a user input indicating the flood zone classification corresponding to the geographic coordinates.

3. The method of claim 1, wherein the property identification data is received from a user input.

4. The method of claim 1, wherein the property identification data is received from a second data processing system.

5. The method of claim 1, wherein the map image is a digital raster image.

6. The method of claim 1, further comprising the step of converting the geographic coordinates to image coordinates using a georeferencing function.

7. The method of claim 1, further comprising the step of receiving a user input which verifies that the correct map image has been displayed.

8. A data processing system having at least a processor, an accessible memory, and an accessible display, for determining the flood zone classification of real property, the system comprising:

a georeferencing component for associating image coordinates with geographic coordinates;

a geocoding component for associating a real property address with geographic coordinates;

a database component containing geographic data and flood data;

mapping component for identifying map images in the geographic data, according to the image coordinates and geographic coordinates; and a display component for displaying the map images identified by the mapping component, whereby the flood zone status of the real property address can be determined from the displayed map image.

9. The system of claim 8, wherein the georeferencing component includes a set of functions for converting between geographic coordinates and image coordinates.

10. The system of claim 8, wherein the geocoding component includes a database of real property addresses and associated geographic coordinates.

11. The system of claim 8, wherein the database component stores data relating to at least one of georeferencing parameters, map boundary polygons, map panel data, and previous flood determinations.

12. The system of claim 8, wherein the mapping component further identifies the location, within an identified map image, of the real property address.

13. The system of claim 8, wherein the display component includes means for allowing a user to manipulate the displayed map image.

14. The system of claim 8, further comprising means for receiving a user input which verifies that the correct map image has been displayed.

15. A computer-assisted method of determining the FEMA flood zone classification of selected real property, which comprises:

(A) receiving a street address of the real property;

(B) geocoding the address to determine the real property's geographic coordinates;

(C) displaying and superimposing on a displayed georeferenced base map, which includes the geographic location of the property, the boundaries of those georeferenced FEMA map insets that are likely to contain the property's geographic coordinates and those map inset boundaries that are proximate to the property's geographic coordinates;

(D) examining the boundaries of the displayed and superimposed inset boundaries and selecting those insets having boundaries that have the highest probability of containing the property's geographic coordinates;

(E) inspecting the selected insets to determine which one thereof both contains the geographic coordinates of the property and is usable to make a flood zone determination for the real property; and (F) inspecting the one inset to determine the flood zone classification of the real property.

16. A method as in claim 15, further comprising:

(G) completing a flood zone certification using data set forth on the displayed base map and on the one inset.

17. A method as in claim 15, wherein:

geocoding step (B) comprises (i) entering a data base containing addresses associated with their related geographic coordinates, (ii) determining whether the address is associated with its related geographic coordinates in the data base, and, (a) if it is so associated, using such coordinates in step (C), or (b) if it is not so associated, determining such coordinates from one or more sources other than the data base.

18. A method as in claim 15, wherein:

the FEMA maps include a plurality of panel maps each bounded by their neatlines, each panel map depicting one or more relatively small geographic areas ("insets") and their flood zone classifications as well as various other data, the boundary of each inset being congruent with, or wholly contained within, the neatlines, and a plurality of index maps each depicting within their neatlines a relatively large geographic area made up of a number of the small geographic areas, the large geographic area being divided into a grid the lines of which are comprised of the neatlines of the panel maps.

19. A method as in claim 18, wherein:

step (C) is effected by displaying and superimposing on the displayed base map (i) the boundaries of those georeferenced insets and (ii) the neat lines of those georeferenced index maps either or both of which contain or are otherwise proximate to the property's geographic coordinates.

20. A method as in claim 19, wherein:

step (D) is effected by selecting those georeferenced insets having either boundaries wholly containing the geographic coordinates of the property or boundaries having a selected proximity to the geographic coordinates of the property.

21. A method as in claim 20, wherein:

step (D) is carried out by visually inspecting the display of step (C).

22. A method as in claim 15, wherein:

steps (E) and (F) are carried out by, first, visually inspecting the display of step (C), then visually inspecting displays of the selected georeferenced insets, and then visually inspecting the one inset.

23. A method as in claim 22, further comprising:

(G) completing a flood zone certification using data set forth on the base map and on the one georeferenced inset.

24. A method as in claim 23, wherein:

step (G) is carried out by visually inspecting the display of the base map.

25. A method as in claim 15, wherein:

the base map is a stored vector map image, which method further comprises (G) defining a grid network on the base map, the grids being congruent with each other, each grid being associated with the insets of one or more georeferenced FEMA maps, and (H) identifying the grid containing the geographic coordinates of the property to effect step (C) so that grid's associated insets are displayed and superimposed thereon.

26. A method as in claim 15, wherein:

the flood zone classification is determined at the request of a client who furnishes the address of the real property, which method further comprises:

(G) completing a flood zone certification using data set forth on the base map and on the one georeferenced inset.

27. A method as in claim 26, which further comprises:

(H) furnishing the completed flood zone certification to the client.

* * * * *

UNITED STATES PATENT AND TRADEMARK OFFICE
CERTIFICATE OF CORRECTION

PATENT NO. : 6,631,326 B1  
DATED : October 7, 2003  
INVENTOR(S) : John Willard Howard et al.

It is certified that error appears in the above-identified patent and that said Letters Patent is hereby corrected as shown below:

Column 7,
Line 7, should read -- a mapping component for identifying map images in the --

Column 8,
Lines 21 and 22, should read -- georeferenced insets and (ii) the neatlines of those georeferenced index maps, either or both of which --

Signed and Sealed this

Seventeenth Day of August, 2004

JON W. DUDAS  
*Acting Director of the United States Patent and Trademark Office*